Oct. 6, 1931.  J. A. SMITMANS  1,825,927
PINION STAND
Filed Sept. 11, 1929   4 Sheets-Sheet 4
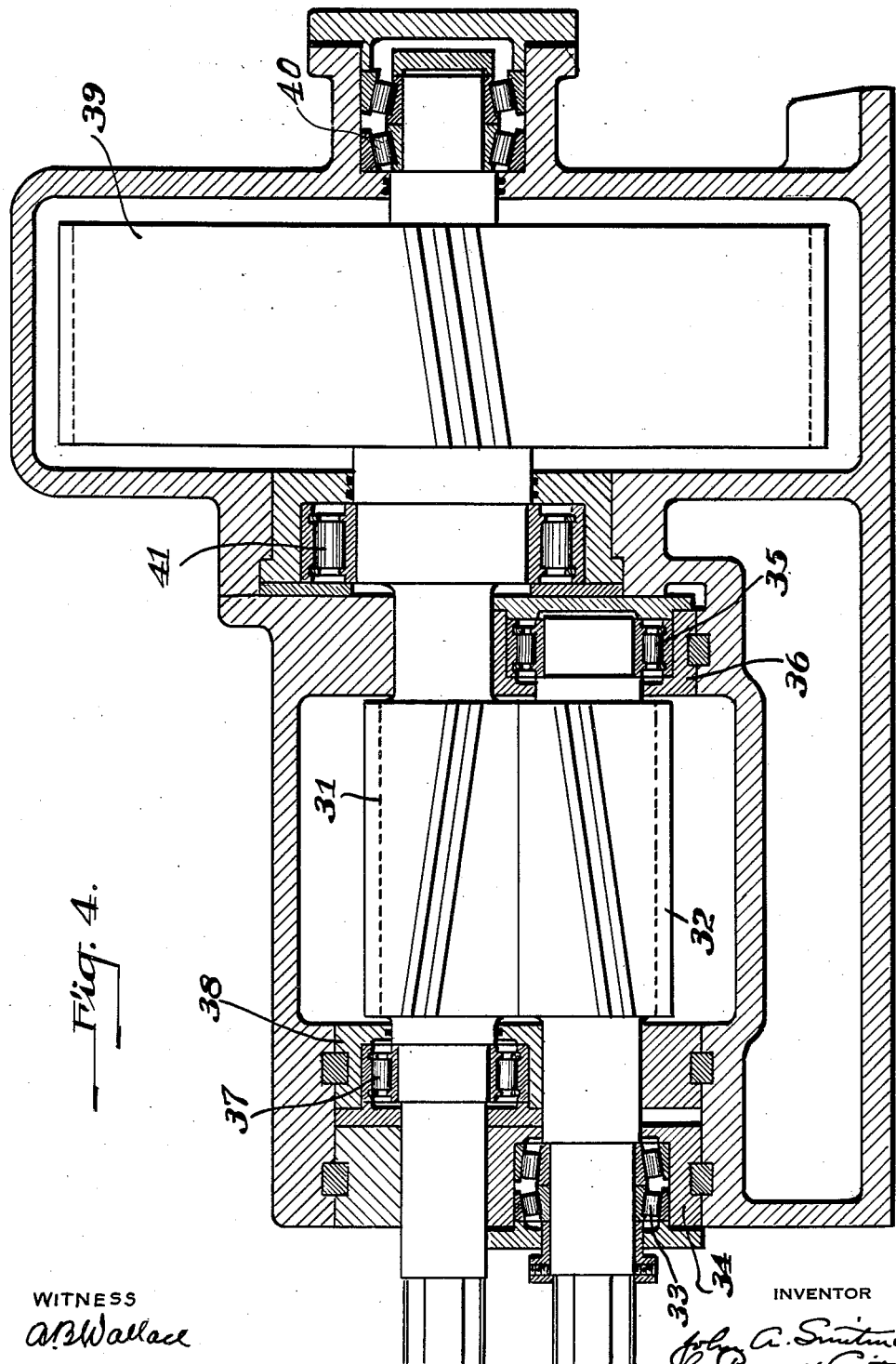

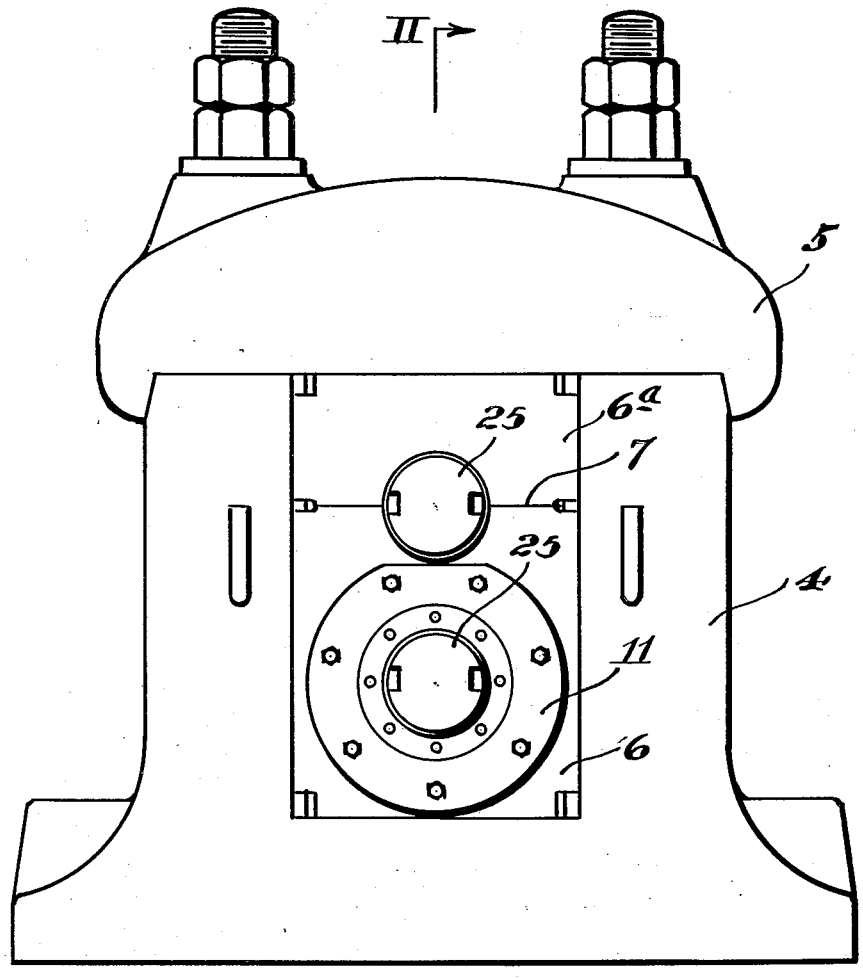

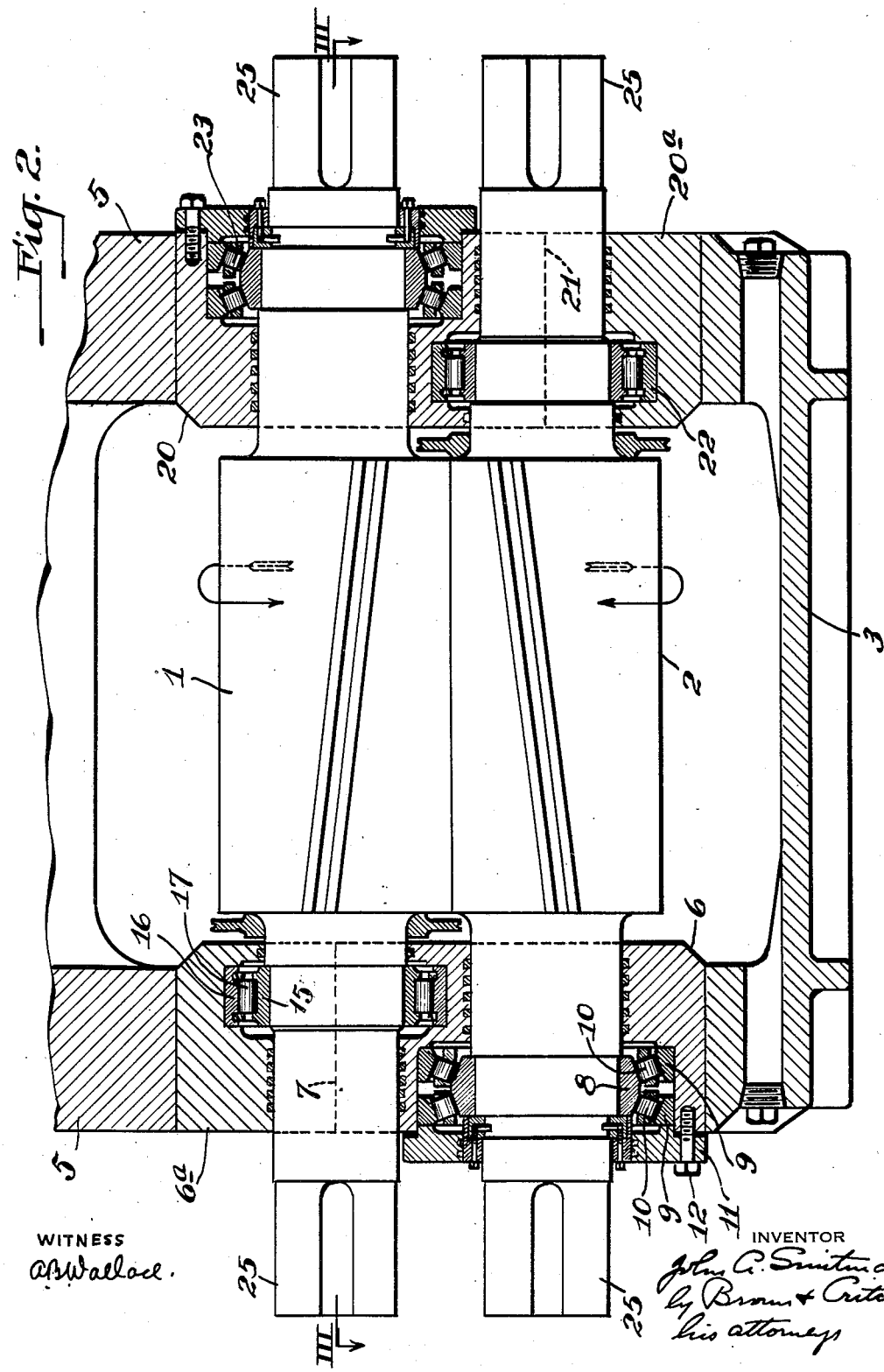

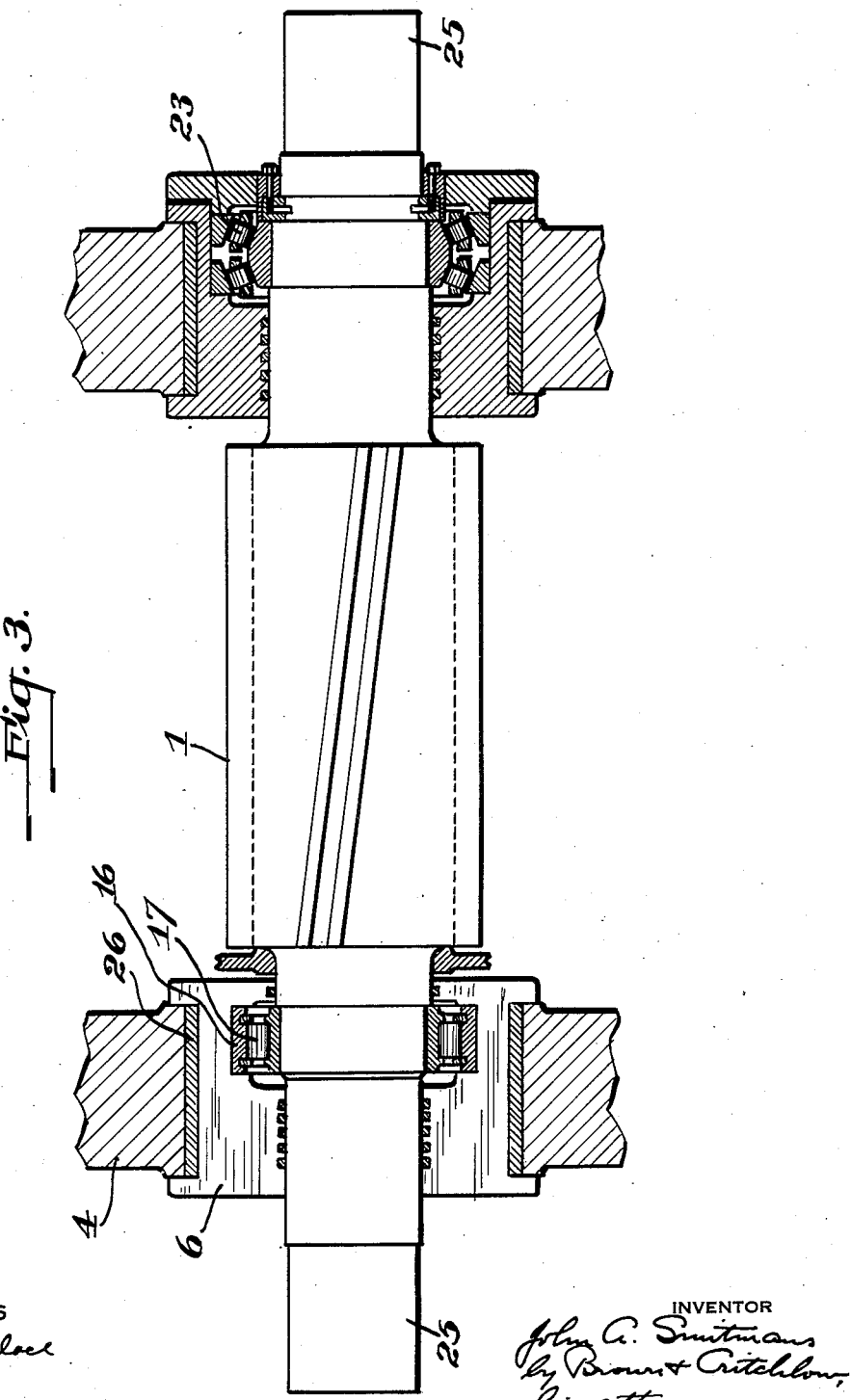

Patented Oct. 6, 1931

1,825,927

UNITED STATES PATENT OFFICE

JOHN A. SMITMANS, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA

PINION STAND

Application filed September 11, 1929. Serial No. 391,834.

The invention relates to pinion stands for metal-rolling and like mills, and, although unlimited to pinion stands for any particular type of mills, is especially suitable for use in connection with sheet rolling mills having relatively small diameter working rolls each of which is backed by one or more supporting rolls.

In the drives of rolling mills it is desirable to have the axis of the driven rolls in such alignment with those of their driving pinions as to form, as nearly as possible, straight line drives through their connecting spindles. For small diameter working rolls it is particularly difficult to do this and at the same time provide adequate bearings for the pinions, especially in cases where the pinions are provided with roller bearings. Accordingly, one object of the invention is to provide the pinions of a stand with roller bearings so constructed and arranged that adequate bearings are afforded for them, and that the pinions may be made of such small diameters that their axes are in, or substantially in, alignment with the rolls to which they are connected.

Further objects are to provide the pinions of a stand with roller bearings in such a way that the stand may be readily assembled and disassembled, and that the pinions may be interchanged in case of neck breakage.

The invention is illustrated in the accompanying drawings, of which Fig. 1 is an end view of a pinion stand; Fig. 2 a vertical section taken on the plane indicated by the line II—II, Fig. 1; Fig. 3 a horizontal sectional view taken on the plane indicated by the line III—III, Fig. 2; and Fig. 4 a view corresponding to Fig. 2 illustrating a modification of the invention.

Having reference first to the embodiment of the invention illustrated in Figs. 1, 2 and 3, a pair of upper and lower pinions 1 and 2 are mounted in a housing having a base 3, ends 4 and a cap 5 suitably bolted to ends 4 as shown in Fig. 1. The pinions are indicated as having intermeshing spiral teeth permitting of relative longitudinal movements of the pinions, as for example, movements consequent upon their thermal expansion and contraction. However, the pinions may have straight teeth, and, as far as concerns the broader aspects of the invention, they may be provided with herringbone or other special forms of teeth. The bearing necks at the ends of the pinions are mounted in bearing blocks or cartridges arranged in windows formed in ends 4 of the housing, the cartridges being provided with recesses for receiving roller bearings for the necks of the pinions, the bearings being arranged in staggered overlapping relationship. That the pinions may be used interchangeable in a manner and for a purpose presently to be explained, the roller bearing for one end of one pinion is preferably a combined radial and end thrust bearing, and for the adjacent end of the other pinion is simply a radial bearing.

Referring again to the drawings, and particularly to Fig. 2, the left ends of pinions 1 and 2 are mounted in a two-part cartridge 6, 6a, divided in the horizontal axial plane 7 of pinion 1. The neck of pinion 2 is provided with a combined radial and thrust bearing comprising an inner ring 8, outer rings 9 and two sets of conical rollers 10 having their axes inclined with relation to each other and to the vertical in the usual manner, the assembled bearing being clamped to cartridge element 6 by means of an annular plate 11 and bolts 12. The left end of upper pinion 1 is provided with a radial bearing comprising an inner ring 15, an outer ring 16 and a single set of horizontally disposed cylindrical rollers 17. As will be noted, the bearings for these adjacent ends of the upper and lower pinions are arranged in staggered overlapping relationship in such a way that relatively small diameter pinions may be provided with strong necks and adequate roller bearing supports.

At their right ends, the pinions are similarly mounted in two-part cartridges 20, 20a, divided on the horizontal axial plane 21 of the lower pinion, there being a radial bearing 22 for the right end of lower pinion 2, and a combined radial and thrust roller bearing 23 for the adjacent end of pinion 1. Cartridge 20, 20a, and the roller bearings between it and the right ends of the pinions, are the same as cartridge 6, 6a and the roller bearings between it and the left ends of the pinions, the cartridges being arranged end-for-end in these two positions.

An advantage of using like, but inverted, cartridges for the opposite ends of the pinions is that the pinions may be used interchangeably in case of neck breakage. Each end of each pinion is preferably provided with a wabbler or drive connection 25, any one of which may be connected either to a motor driven element or to a roll-connecting spindle. Ordinarily the neck, particularly the driving connection portion thereof which is connected to a motor, is subjected to greater strain than any other portion of the pinions of a stand. In case the driving connection of one pinion should break, the pinions and their mounting cartridges may be either inverted in their entirety, or the top and bottom pinions may be interchanged and inverted end-for-end. Thus the breakage of the driving connection of one pinion does not render it useless.

A further advantage in the particular construction shown in Fig. 2 is the ease of assembly of the pinion stand. Before the pinions are placed in the housing, the larger elements of their bearing cartridges, as well as all of the roller bearings may be assembled on them. For example, cartridge element 6 and radial and thrust bearing 9 may be assembled on the left end of pinion 2, and radial bearing 22 on its right end. In a similar manner cartridge element 20 and radial and thrust bearing 23 may be assembled on the right end of pinion 1, and radial bearing 17 on its left end. With cap 5 of the housing removed, cartridge element 20a is first placed in position, and thereafter pinion 2 with the assembled parts just described are lowered to position. Following this, upper pinion 1 and the parts assembled on it are placed in position, and cartridge element 6a placed on top of its companion part 6. With the pinions thus entirely assembled, cap 5 may be bolted to the housing. As shown in Fig. 3, wearing plates 26 may be arranged between the cartridges and the walls of the cartridge-receiving windows formed in the ends of the housing.

A further advantage of the invention is that the roller bearings are so formed and arranged as to permit of thermal longitudinal expansion and contraction of the pinions. Lower pinion 2 being provided with a combined radial and thrust bearing at its left end may expand and contract to the right as viewed in Fig. 2, and the right end of pinion 1 being provided with a combined radial and thrust bearing may expand and contract to the left, the radial bearings 20 and 17, respectively, of these pinions permitting of such movements of the ends of the pinions. By providing the pinions with helical or straight teeth, they remain in proper meshing engagement with each other regardless of the extent of thermal expansion and contraction of the pinions in opposite directions.

In Fig. 4 there is shown another embodiment of the invention, in which a pair of pinions 31 and 32 are provided with roller bearings arranged in staggered overlapping relationship. In this case, the left end of lower pinion 32 is provided with a combined radial and thrust roller bearing 33 mounted in a cartridge 34, and its right end is provided with a radial bearing 35 mounted in a cartridge 36. The left end of upper pinion 31 is provided with a radial bearing 37 mounted in a separate cartridge 38, while its right end is extended to receive a gear 39 forming the last of a train of reduction gears, the hub or neck of the pinion beyond such gear being provided with a combined thrust and radial bearing 40. Between gear 39 and pinion 1 the neck or shaft of the pinion is provided with a radial roller bearing 41 arranged in staggered overlapping relationship with roller bearing 35 of pinion 32. The upper pinion is therefore provided with two radial and one combined radial and thrust bearing, the arrangement being such that thermal contraction and expansion of the pinions may take place in opposite directions in the manner explained with reference to the other embodiment of the invention. Manifestly various other forms and arrangements of pinion stands may have their pinions provided with roller bearings arranged in staggered overlapping relationship and otherwise constructed to have the advantages of this invention.

According to the provisions of the patent statutes, I have explained the principle and mode of operation of my invention, and have illustrated and described various embodiments of it. However, I desire to have it understood that, within the scope of the appended claims, the invention may be practiced otherwise than as specifically illustrated and described.

I claim as my invention:

1. A pinion stand comprising a housing, a pair of intermeshing pinions therein each having bearing necks at their ends, a two-part cartridge at each end of the pinions, each cartridge being divided in the horizontal axial plane of one pinion and receiving the adjacent bearing necks of both pinions, and roller bearings for the necks of the pinions arranged in staggered overlapping relationship in said cartridges.

2. A pinion stand comprising a pair of cooperating pinions in superimposed relation, anti-friction bearings at the ends of the pinions for supporting them, the bearing at one end of the upper pinion being disposed outside of and overlapping the bearing on the same end of the lower pinion, a bearing cartridge at said end of the pinions having inner and outer openings for supporting the anti-friction bearings, said cartridge comprising two parts divided on a plane through the axis of the lower pinion, whereby the lower innermost bearing may be inserted before the pinions are assembled, and means for retaining the upper bearing within the outer opening in the cartridge.

3. A pinion stand comprising a pair of cooperating pinions in superimposed relationship, anti-friction bearings at the ends of the pinions for rotatably supporting them, the bearing at one end of the upper pinion being disposed outwardly of and in overlapping relationship to the bearing on the lower pinion, and the bearing at the other end of the upper pinion being disposed inwardly of and in overlapping relationship to the bearing at that end of the lower pinion, and a bearing cartridge disposed at each end of the pinions and having openings for receiving the anti-friction bearings, each of said cartridges being in two parts which separate on a plane along the axis of the innermost bearing.

4. A pinion stand comprising cooperating pinions having journal necks, a radial load sustaining bearing on one neck of each pinion, said bearings being disposed relatively near to the pinions and at opposite ends of the pinion stand, a combined radial and thrust load sustaining bearing on the other neck of each pinion disposed at one side of and overlapping the radial bearing on the neck of the other pinion, and a bearing cartridge disposed at each end of the pinions to support the bearings, said bearing cartridges having counter-sunk openings for receiving the combined bearings and being split along the horizontally longitudinal plane of the pinion axis for receiving the radial bearings.

In testimony whereof, I sign my name.

JOHN A. SMITMANS.